Sept. 22, 1970  J. B. TERRY  3,530,386
ADJUSTABLE VOLTAGE SOURCE
Filed Oct. 11, 1967  2 Sheets-Sheet 1

FIG. I.

INVENTOR
John Brian Terry
BY
Baldwin Wight Diller & Brown
ATTORNEYS

United States Patent Office 3,530,386
Patented Sept. 22, 1970

3,530,386
ADJUSTABLE VOLTAGE SOURCE
John Brian Terry, Essex, England, assignor to The Marconi Company Limited, London, England, a British company
Filed Oct. 11, 1967, Ser. No. 674,488
Claims priority, application Great Britain, Nov. 2, 1966, 49,215/66
Int. Cl. G06g 17/12
U.S. Cl. 328—142                                    4 Claims

ABSTRACT OF THE DISCLOSURE

An adjustable voltage source for producing any of a range of fixed voltages lying on a voltage curve consisting of a plurality of linear portions between successive voltage values lying in geometrical progression comprising an output resistance, a plurality of current generators, the currents from which when fed directly to the resistance produce the voltage values lying in geometrical progression and a divider through which the current of any one of the generators is passed before being fed to the resistance so as to produce voltage values on the linear portions, switching means being provided to obtain the appropriate routing of the currents.

---

Figure 1:
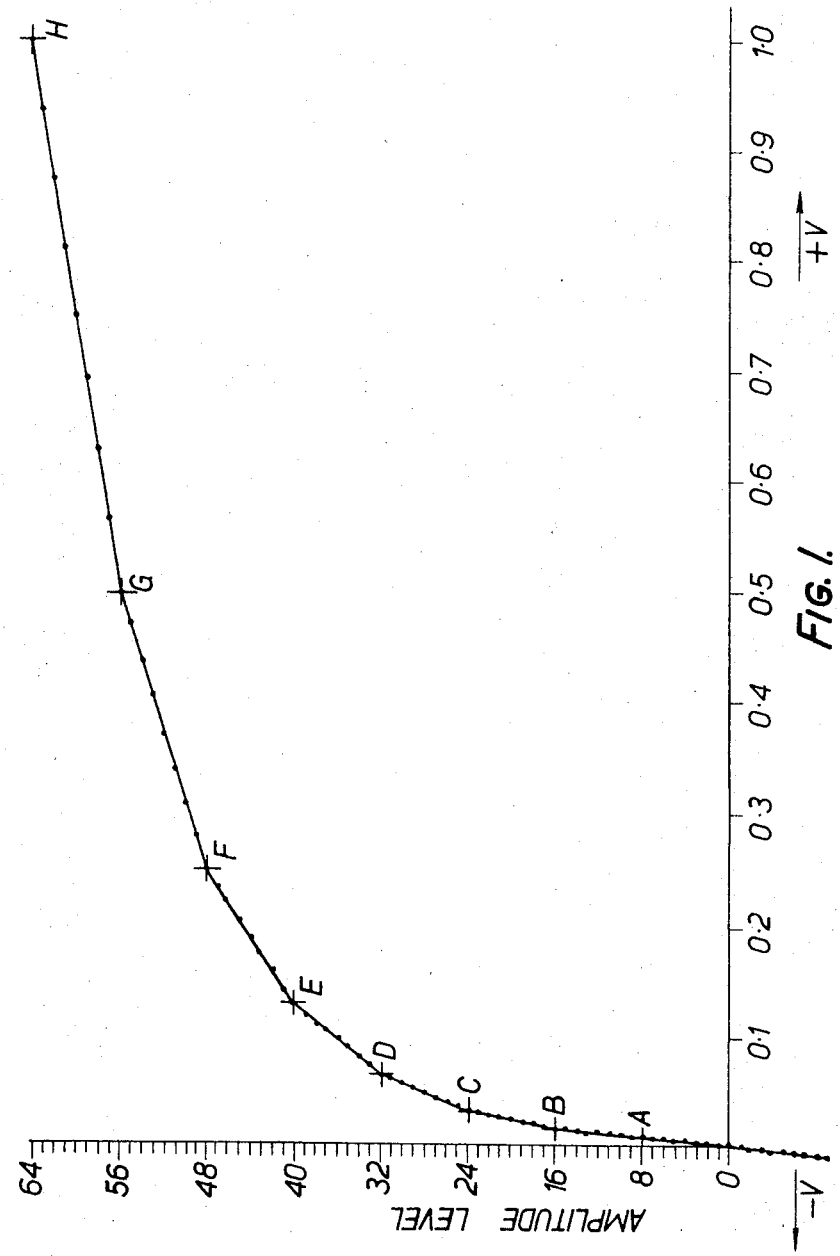

The present invention relates to adjustable voltage sources and more particularly, although not exclusively, to adjustable voltage sources for use in P.C.M. encoders or decoders.

In feedback P.C.M. encoders digitally coded signals are produced by comparing the analogue signal to be translated with a voltage from an adjustable voltage source. The voltage source is adjustable over a range of fixed values and is adjusted at each comparison to produce an output signal which when fed to the comparator is substantially equal to the instantaneous analogue signal. The required P.C.M. signal is then simply a signal representative of a particular voltage value required to equate the analogue signal. In P.C.M. encoders a corresponding voltage source is used which produces a voltage output corresponding to the received P.C.M. signal.

When speech signals are to be transmitted the voltage sources used for the P.C.M. encoders and decoders commonly do not employ a linear variation of voltage with voltage step but obey a so-called companding law. Some of these laws require a range of predetermined voltage values lying on a voltage curve consisting of a series of linear portions between pairs of successive junction voltage values with the other predetermined voltage values lying on the linear portions. Such a range of predetermined voltage values shall be hereinafter referred to as a voltage value range of the kind specified. It is common for the successive junction voltage values to lie in geometrical progression, with a further linear portion of the voltage curve extending between zero voltage and the first of the values in geometrical progression.

It is an object of the present invention to provide an adjustable voltage source capable of producing a plurality of fixed voltage values constituting a voltage value range of the kind specified.

According to this invention an adjustable voltage source for producing a voltage value range of the kind specified comprises a plurality of current generators, an output resistance, a divider connected to the output resistance, and switching means for selectively connecting one or more of the current generators to feed current to said output resistance and for selectively connecting any one of said current generators to the divider, the current values of the current generators being such that the current from the first generator fed through the output resistance produces a voltage thereacross equal to the first of said junction voltage values and such that successive addition of the currents from the other generators produces successively the other junction voltage values, a voltage value of said range lying on a linear portion being producible across the output resistance by feeding current directly to the resistance from the current generators required to produce that junction voltage value which is immediately below the desired value and adding thereto an appropriate fraction obtained from said divider of the current from the next successive current generator.

In a preferred embodiment of the invention the successive junction voltage values lie in geometrical progression.

One voltage value range of the kind specified requires the linear portions to be divided into eight equal sections by seven equally spaced voltage values. To produce this range the divider is arranged to produce outputs corresponding to zero current or eighths up to maximum of seven-eighths of the current fed thereof.

Preferably an inverter is positioned between the output resistance and both the dividing arrangement and the current generators whereby the current direction through the output resistance may be reversed thereby reversing the polarity of the output voltage.

Figure 2:
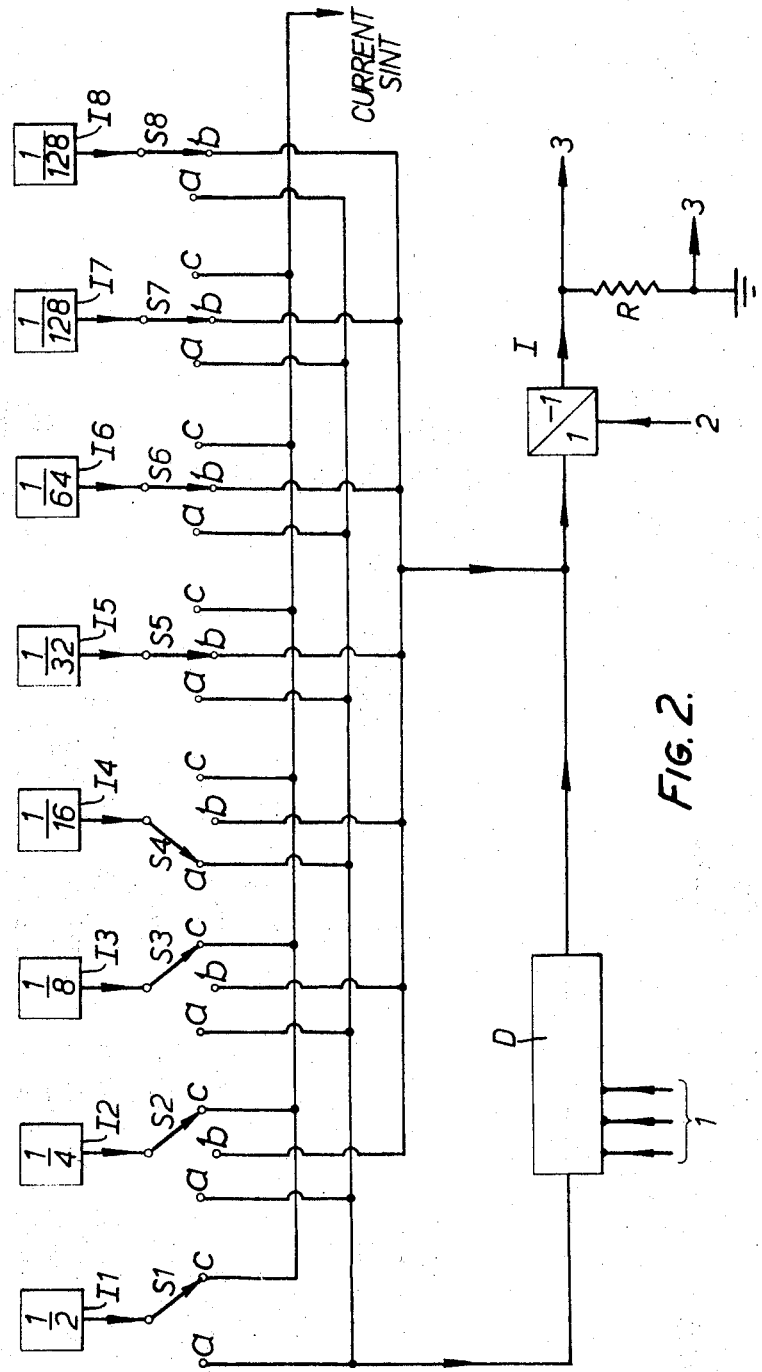

Reference will now be made by way of example to the accompanying drawings in which:

FIG. 1 is a graphical figure showing a voltage value range of the kind specified, and FIG. 2 is a block diagram of an adjustable voltage source according to the invention.

In FIG. 1 there is shown in graphical form a voltage value range of the kind specified, the ordinate representing the amplitude levels from 0 to 64 and the abscissa representing voltage. This curve represents the desired output characteristic of an adjustable voltage source for use in a P.C.M encoder or decoder. The voltage represents the analogue voltage to be compared or reproduced and the amplitude level is the value which is transmitted in digital form as a P.C.M. signal. Only half the voltage range used in the P.C.M. encoder or decoder is in fact shown, the negative portion which is a mirror image of the positive portion having been omitted.

As can be seen, the curve consists of eight straight line portions joining the points O, A, B . . . H, the junction voltage values of the points A to H lying in geometrical progression with a multiplier of 2. Each straight line portion is equally divided by seven further voltage values into eight equal portions.

The P.C.M. signal employs seven digits, the first digit representing the polarity of the voltage being coded and the remaining six digits representing the amplitude level of the voltage. It is possible to represent 64 levels with six digits and in practice the levels transmitted include 0 and therefore only the levels from 0 to 63 can be transmitted, the voltage step 64 corresponding to voltage H is therefore not used.

FIG. 2 shows an adjustable voltage source capable of producing a series of fixed voltage values corresponding to the range of values shown in FIG. 1. Since it is not used in practice the voltage source shown can not produce the voltage H although by simple modification this voltage also could be produced. The arrangement comprises eight current generators $I_1$ to $I_8$, the current generators providing respectively currents having values $I/2$, $I/4$, $I/8$, $I/16$, $I/32$, $I/64$, $I/128$, and $I/128$ where I is the total current obtained by adding all the current generator outputs. The current generators are each connected to the moving contact of a respective switch $S_1$ to $S_8$ each of which switches apart from $S_1$ and $S_8$ has three fixed contacts $a$, $b$ and $c$. Switches $S_1$ and $S_8$ have only two fixed contacts, switch $S_1$ having contacts $a$ and $c$ and switch $S_8$ having fixed contacts $a$ and $b$. All the fixed contacts $c$ are connected to a so-called "current sink," all the contacts $b$ are connected to an inverter I and all the contacts $a$ are connected to the input of a divider D. The output of the divider D is also connected to the input of the inverter I, the output of which is connected to one end of a load resistance R. The other end of the load resistance R is connected to earth. The divider has control inputs 1 and the inverter has a control input 2. Output leads 3 are connected one to each end of the load resistance R.

The voltage source operates as follows to produce any of the desired voltage values lying on the voltage curve of FIG. 1.

The value of the total current I producible by summing the currents of all the generators is such that when it is passed through resistance R it produces the voltage corresponding to the point H thereacross. Obviously therefore the current from generator $I_8$ would produce a voltage corresponding to point A across the resistance R, the current from $I_8$ plus that of $I_7$ would produce the voltage of point B and so on. By successively adding the currents from the generators, starting with that of $I_8$, therefore, any of the junction voltages corresponding to the points A, B, C, D, E, F and G lying in geometrical progression may be produced. A current from generator $I_1$ cannot be fed directly to the resistance but must pass through the divider and therefore the voltage corresponding to point H cannot be produced.

To obtain any of the voltage values on the straight line section OA apart from the voltage of point A, switch $S_8$ is switched to position $a$ so that current from current generator $I_8$ is fed to divider D. This divider is then controlled by signals applied to the inputs 1 to give either zero current or up ot seven-eighths of the current $I_8$ from generator $I_8$ in eighths steps. The current from the divider is fed to the output resistance R and produces thereacross the desired voltage. To obtain the voltage corresponding to the point A switch $S_8$ is switched to position $b$ to feed the current from generator $I_8$ directly to resistance R. To obtain voltage values on the straight line section from point A to B other than that of point B, the current from generator $I_7$ is fed via the divider D to the load resistance R and is added to the current from generator $I_8$ which is fed directly to the load resistance, the current from the divider consisting of either zero current or up to seven-eighths of the current $I_7$ to produce the appropriate voltage. The voltage corresponding to point B is obtained by switching $S_7$ to position $b$ such that the full currents from both generators $I_7$ and $I_8$ are fed to resistance R. Similarly the voltage corresponding to any of the amplitude levels lying on the linear portion between two of the values lying in geometrical progression may be produced by feeding the full currents from the current generators required to produce the lower of the values lying in geometrical progression directly to resistance R and adding thereto an appropriate fraction of curent from the next successive current generator by feeding this current to resistance R through the divider.

Since all the currents from the generators pass through the inverter I, corresponding negative voltages can be obtained by simply reversing the current in the inverter. The switches $S_1$ to $S_8$, divider D and inverter I are controlled in operation by a logic circuit (not shown). Any suitable design of current generator, divider or inverter could, of course, be used and the switches $S_1$ to $S_8$ may comprise electronic switches or electro-mechanical switches.

The value of the current generators may be chosen to suit any desired multiplier of a geometrical progression and the divider can be constructed to produce any desired division of the current fed thereto.

Similarly the currents may be chosen such that the junction voltage values do not form a geometrical progression but lie at such points on a voltage curve as are desired for the P.C.M. encoder or decoder or other apparatus with which the voltage source is to be used.

I claim:

1. An adjustable voltage source for producing a voltage value range of the kind which includes a range of predetermined voltage values lying on a voltage curve consisting of a series of linear portions between pairs of successive junction voltage values with the other predetermined voltage values lying on the linear portions; said source comprising a plurality of substantially constant current generators, an output resistance, a current divider connected to the output resistance, and switch means for selectively connecting one or more of the current generators to feed current to said output resistance and for selectively connecting any one of said current generators to the current divider, the current values of the current generators being such that the current from the first generator fed through the output resistance produces a voltage thereacross equal to the first of said junction voltage values and such that successive addition of the currents from the other generators produces successively the other junction voltage values, a voltage value of said range lying on a linear portion being producible across the output resistance by feeding current directly to the resistance from the current generators required to produce that junction voltage value which is immediately below the desired value and adding thereto an appropriate fraction obtained from said current divider of the current from the next successive current generator.

2. A source as claimed in claim 1 wherein the successive junction voltage values lie in geometrical progression.

3. A source as claimed in claim 2 and adapted to produce a voltage value range with linear portions divided into eight equal sections by seven equally spaced voltage values wherein the divider is arranged to produce outputs corresponding to zero current or eighths up to a maximum of seven-eighths of the current fed thereto.

4. A source as claimed in claim 3 wherein an inverter is positioned between the output resistance and both the dividing arrangement and the current generators whereby the current direction through the output resistance may be reversed thereby reversing the polarity of the output voltage.

References Cited

UNITED STATES PATENTS

| | | | |
|---|---|---|---|
| 2,895,046 | 7/1959 | Martin | 235—197 |
| 3,267,200 | 8/1966 | Anderson et al. | 328—78 |
| 3,426,187 | 2/1969 | Partridge | 235—197 |

DONALD D. FORRER, Primary Examiner

B. P. DAVIS, Assistant Examiner

U.S. Cl. X.R.

307—229